July 28, 1964   A. C. MAGNUS   3,142,561
PHOTOELECTROMAGNETIC MOSAIC AND METHOD OF USING SAME
Filed May 12, 1958   2 Sheets-Sheet 1
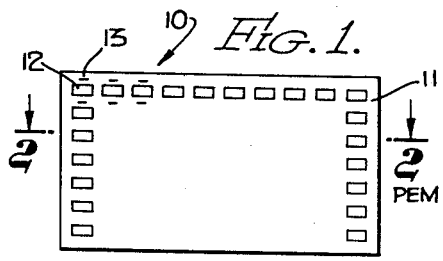
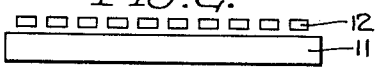
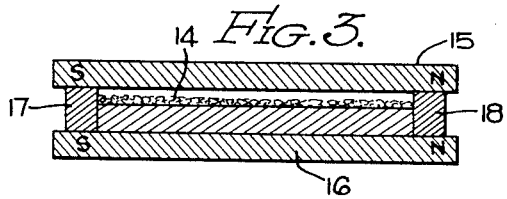
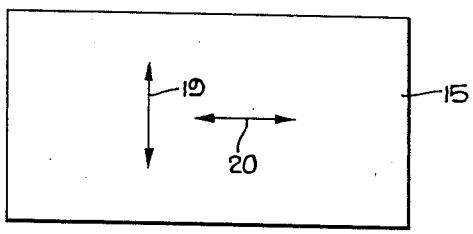
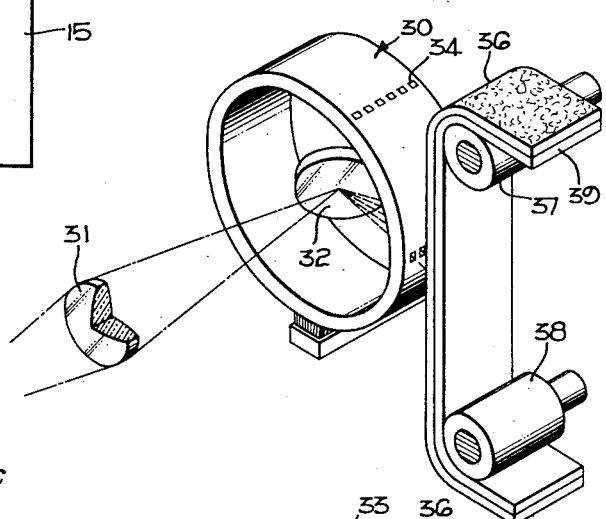
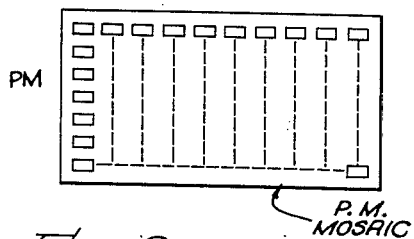
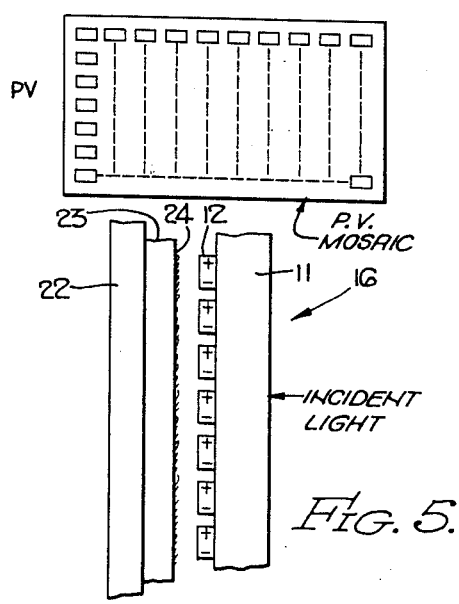
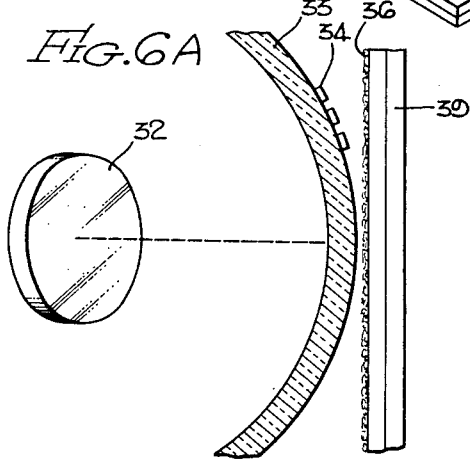
INVENTOR,
AGATHA G. MAGNUS
BY Lyon+Lyon
ATTORNEYS

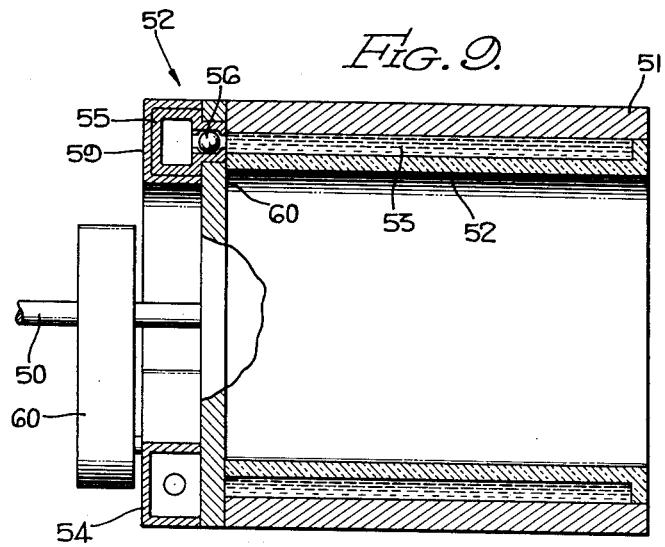
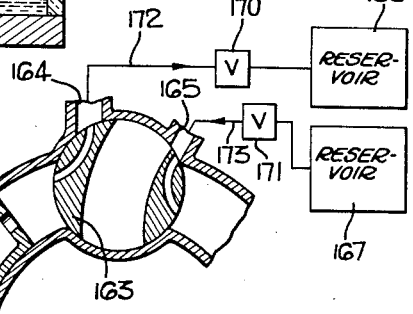
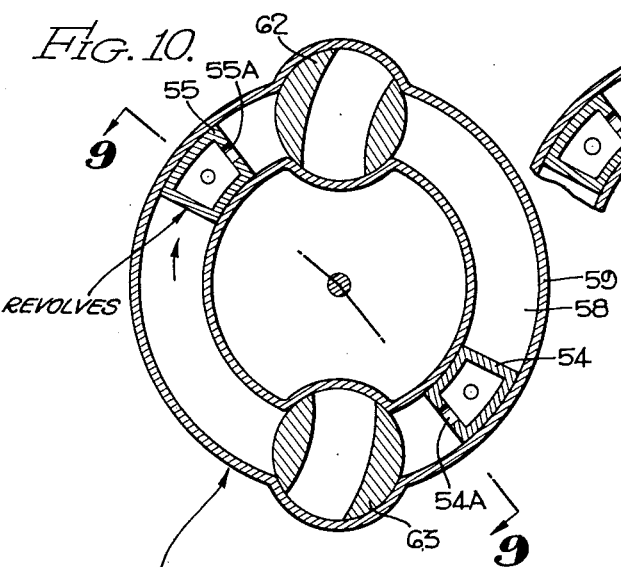
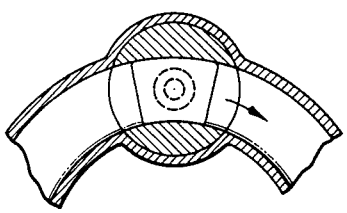
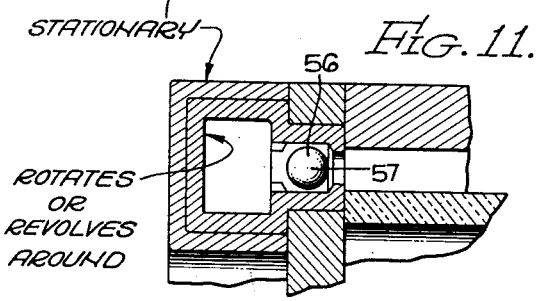

United States Patent Office 3,142,561
Patented July 28, 1964

3,142,561
PHOTOELECTROMAGNETIC MOSAIC AND
METHOD OF USING SAME
Agatha C. Magnus, Pasadena, Calif., assignor to
Michael G. Heaviside
Filed May 12, 1958, Ser. No. 734,652
12 Claims. (Cl. 96—1)

The present invention relates to mosaic structures and to methods for producing the same for use in, but not limited to, uses in photography and to cooling systems therefor involving new pumps.

Briefly, there are described herein mosaics each comprising a multiplicity of elements which exhibit, photoelectromagnetic (PEM) effects. Each of these mosaics is described in relationship to a photographic system although it is understood, of course, that other uses may be made of the same.

The following brief description of the PEM mosaic gives an indication of the size and results achieved by the other two PM and PV mosaics.

The PEM mosaic described herein includes a radiation transparent base upon which small semiconductor crystals are placed in proximity to small magnets to achieve photoelectromagnetic (PEM) effects. In such case, it has been observed that when a slab of a semiconductor is placed in a magnetic field and is illuminated in a direction at right angles to the field, a voltage is developed in the mutually perpendicular direction. The semiconductor may, for example, be germanium, indium antimonide, lead sulphide, gallium arsenate or the like.

In accordance with one important aspect of the invention, the semi-conductor crystals of such material are relatively small, for example, cubes having a linear dimension of, for example, $10^{-4}$ centimeters which cooperate with magnets of comparable size. Linear magnets having a length of approximately one micron are available for these purposes and are described in Electrical Manufacturing for January 1957, on page 62.

It is desirable for purposes of resolution and other purposes to which the mosaic is used to make the mosaic elements as small as possible.

One important aspect of the present invention is explained by reference to the methods whereby such small crystals and small magnets, in case of the PEM mosaic, may be assembled so as to cooperate in obtaining the PEM effect in a mosaic that comprises a multiplicity of such crystals and magnets. This involves generally suspending the crystals and the magnets in a mixture with a volatile solution, placing such mixture on a radiation transparent base, and subjecting the assembly to vibrations while under the influence of a magnetic field and then allowing the volatile solution to evaporate after which the crystals and magnets are spaced relative to each other in a particular pattern for use as a mosaic.

It is, therefore, an object of the present invention to provide mosaics of this character.

Another object of the present invention is to provide mosaics of this character which may be used for many different purposes which include but are not limited to the following uses, namely, in photography, facsimiles, computers, seeker heads, coders, generators and the like.

Another object of the present invention is to provide mosaics of this character in which the individual elements differ from each other for achieving broad band characteristics.

Another object of the present invention is to provide an arrangement for realizing PEM effects without the necessity of individual electrodes for individual elements.

Another object of the present invention is to provide an arrangement for realizing PEM effects in which results may be achieved in accordance with the dipole field and which does not depend on the flow of surface current external to semiconductor across the surface or through conductors, and similarly across the surface of dielectric printing surfaces or electric conductors in contact therewith.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURES 1 and 2 show respectively a top and cross sectional view of a PEM mosaic produced in accordance with the present invention, the size of the crystals and magnets, however, being shown, out of proportion with respect to the base, for purposes of illustrating more clearly the orientation of the crystals and magnets, it being noted that FIGURE 2 is a section along the line 2—2 of FIGURE 1.

FIGURES 3 and 4 illustrate the techniques used in producing the mosaic shown in FIGURE 1.

FIGURE 5 illustrates the dipole field created in case of the PEM mosaic and the manner in which the same by its current flow field is used in photography.

FIGURE 6 illustrates a cylindrical form of PEM mosaic used in photography.

FIGURES 7 and 8 are views like FIGURE 1 but illustrate respectively a PM and PV mosaic.

FIGURES 9, 10, 11 and 12 pertain to a modified arrangement whereby cooling is effected.

FIGURE 13 shows another modification.

Referring to FIGURE 1 it will be seen that the mosaic 10 includes a radiation transparent base 11 of, for example, glass or quartz on which the individual semiconductor crystals 12 and linear magnets 13 are mounted in a predetermined pattern to realize PEM effects.

The size of the crystals and magnets are exaggerated for purposes of illustration and it is understood that they are each of a size as small as practical. With present day techniques, they may have a linear dimension of approximately one micron, i.e., approximately $10^{-4}$ centimeter. It is preferred that the crystals be in the form of a cube and the magnets be needle magnets of comparable length.

It will be seen that the crystals 12 are in rows and that between adjacent rows of such crystals 12, there is a row of linear magnets 13, so that each crystal has a pair of magnets flanking it.

This assembly is produced using the following described techniques. Initially, the crystals and linear magnets are mixed in homogeneous mixture in which they are suspended, containing a volatile liquid as, for example, alcohol or ether and an adherent. Such mixture is applied in the form of a layer approximately one micron thick onto the plate 11.

Such plate 11 with the layer of such mixture 14 thereon is then placed between two permanent magnet plates 15 and 16, as shown in FIGURE 3, with spacers 17 and 18 serving to space the magnets and to retain the plate 11 in an assembly which is subjected to vibration at an ultrasonic frequency. The particular frequency used determines the spacing between adjacent rows of the crystals. The frequency used may, for example, be 100 kilocycles or, indeed, may extend up into megacycle ranges, depending upon crystal size and desired spacing between adjacent rows of crystals. Such vibrations are, for example, applied to the assembly shown in FIGURE 3 in a direction perpendicular to the plane of the paper which corresponds to the direction indicated by the arrows 19 or 20 in FIGURE 4.

As a result of such vibration and the freedom of mobility of the crystals in the mixture, the crystals locate themselves at the nodes of such vibrations to which the assembly is subjected; and simultaneously the needle magnets are each oriented magnetically and in the same magnetic direction due to their magnetic interaction with the magnetic field produced by the magnets 15, 16. Then the magnets 15, 16 and spacers 17 and 18 are removed to allow the volatile liquid in the mixture to evaporate with the result that the adherent bonds the crystals and needle magnets in the positions they have assumed by the foregoing and as shown in FIGURE 1. In order to obtain the closest possible spacing of the crystals, the plate may be vibrated in accordance with a plurality of vibrations of the same frequency but which are out of phase.

Instead of using an adherent in the original mixture, such adherent may be omitted and instead, the oriented crystals and magnets may be sprayed (after the volatile liquid has evaporated) with a suitable adherent liquid which, when dry, serves to bond the crystals and needle magnets to the plate 11.

As mentioned previously, the crystals may not be all of the same type but may be of different materials for achieving "broad band" characteristics in those applications where such characteristics are desirable. In such case, some of the crystals are more sensitive to incident radiation than are other crystals.

As illustrative of some of the uses to which the mosaic shown in FIGURE 1, reference is made to FIGURE 5.

In FIGURE 5, the mosaic 10 is used in photography and positioned, as shown with respect to a magnetized tape 22 and a sheet of "photographic" paper which has diamagnetic and/or dielectric particles 24 of, for example, barium titanate adhering thereto due to the magnetic field produced by tape 22. In some cases, the tape 22 may not be necessary but instead, the particles may be blown under pressure on to the paper 23 and held there electrostatically. The incident light from the subject being photographed enters the transparent base 11 and produces a PEM effect on each crystal 12 as indicated by the plus and minus sign on the crystals. The degree of this effect is dependent upon the light intensity impinging on each crystal under consideration and in general, the greater the intensity, the greater is the intensity of the dipole represented by the plus and minus signs. The intensity of such dipole and thus the density of the associated current flow field determines whether or not such particles and the number of the same which, preferably, are somewhat smaller in size than the crystals 12, are pulled away from the paper 23. There may be a layer several particles deep, for the purpose of obtaining halftones, so that taking away one particle leaves a lighter spot immediately but not a white spot immediately. Only when the dipole is strong enough to lift a few, will there be a white spot. The picture is not a two tone but has as many half tones as the size of the particles allows and this picture is produced on the paper 23 which is then preserved by either spraying the "picture" with a transparent substance which is allowed to harden and maintain the remaining particles 24 on paper 23 or by covering the picture with a transparent plastic sheet which is bonded to the edges of the paper 23. In either case, thereafter, the magnetized tape 22 serves no particular useful purpose and may be disassociated from the paper 23. The picture can also be preserved by heating and thus fusing the particles to the paper.

Other methods may be used in producing the PEM mosaic shown in FIGURE 1. For example, the crystals and magnets may be sprayed onto the base 11 having an adherent thereon and with the crystals and magnets being sprayed through a nozzle or nozzles having a predetermined aperture pattern. The crystals may be sprayed first and then the magnets are sprayed. The magnets are oriented by an external auxiliary field produced by magnet slabs 15 and 16 before the adherent sets as before.

Another method which may be used is to pass the plate 11 through a closed chamber in which the crystals are suspended in an adhesive vapor and the magnets may be previously applied and oriented or applied and oriented after the crystals are thus placed in position.

To clarify the differences between PEM and other effects the drawings also illustrate a PM and PV mosaic in which the elements have comparable size and spacing. In the case of the PM mosaic, the elements may, for example, be nickel, copper, sulphur, semiconductor crystals such as, for example, of indium-antimonide or the like, or a combination of the same which may be assembled on the transparent plate as previously described. For a more complete understanding of the PM effect and materials which may be used to produce such effects, reference is made to Physical Review 60, page 169, 1941, and also 61 page 733, 1942.

It is observed that no magnets are used in the PM mosaic and the powder on the "photographic paper" is paramagnetic, i.e., attractable by a magnetic field, in and of itself and does not generate a magnetic field. Such powder aligns itself with lines of force and can be magnetized.

In the case of the PEM mosaic, the powder on the "photographic paper" is diamagnetic, does not generate a magnetic field and tends to move out of the magnetic field of the magnetized tape 22 under the influence of the quasi-instantaneous current flow field associated with the mosaic crystal dipole formation.

In each case, the powder is initially evenly distributed on the paper by brushing, spraying, by-passing the paper through a cloud chamber in which the powder is suspended or the like; and in each instance, the powder clings to the paper due to the field exerted by the magnetized tape.

For comparison purpose it is pointed out that the PV mosaic includes a like structure in which the individual elements are of the same size and spacing described above and may be all of the same material or different materials to achieve broad band effects. The elements of the PV mosaic are phosphors such as used on the screen of a cathode ray tube and become electrically charged when excited by light. The PM and PEM mosaics are preferred, however, since it is considered that the phosphors of the PV mosaic require a longer time to exhibit a charge and maintain such charge for a relatively long time.

FIGURE 6 shows a photographic system in which the mosaic is in the form of a cylinder or drum and the mosaic shown therein is considered to be of the PEM type.

The rotatable drum 30 receives light from the subject being photographed which is directed by the lens 31 and then reflected by the mirror 32 onto the inner transparent cylindrical base 33 having a multiplicity of PEM, elements 34 on the outer periphery of the drum.

The "photographic paper" 36 is fed into position over rollers 37 and 38, being backed by the magnetized tape 39 which holds the diamagnetic or paramagnetic powder in place on the paper 36. As a result of the light exposure selected portions of the powder are removed from the paper 36 in accordance with the PEM effect as the case may be and become lodged on the drum 30 spaced from the paper. The particles may subsequently be removed upon rotation of the drum 30 by means illustrated in the form of a brush 40 and/or by vacuum so that they do not interfere with subsequent operation and may be reused.

An image of the subject thus photographed appears on the paper 36 and such image may be preserved using different expedients such as by spraying, covering with a transparent plastic overlay or by the application of heat. After this is accomplished, the tape backing is no longer required and may be disassociated from the paper.

It will thus be observed that instantaneous halftones are produced without the need for a screen by a process which involves removal of image forming powder instead of placement of powder. Such powder affords good resolution since it may be of submicroscopic size.

When a "negative" instead of a positive print is desired, a transparent sheet of paper coated with suitable adherent may be placed over the paper 36 upon which the positive is photographed to lift off onto such sheet that powder remaining on the paper 36 and thereafter, the adherent is allowed to set.

It will be further observed that if the light image powder adheres to a dark background of paper, a negative will result. Conversely, if dark image powder adheres to a light background, a positive image results.

In FIGURE 6, it will be observed that the magnetic field of the tape 39 opposes that of the residual charge on drum 30 so that essentially a neutral field exists between them so that the loose particles which are magnetically attached by the tape 39 are not removed by the magnetic field exhibited by the drum. This further assures the fact that the particles will be transferred to the drum only in proportion to the electrical charge or magnetism developed in proportion to the intensity of the light energy reaching the back of the coating through the glass drum.

In the modified arrangement shown in FIGURES 9–12, the drum 51 is of any one of the types previously described and radiation is directed on to the inner cylindrical prepared surface of the drum, as shown for example, in FIGURE 6. In this case, however, a generally cylindrical radiation transparent sleeve 52 is in the interior of the drum 51 and so arranged as to provide a closed annular space 53 in which a coolant fluid or gas is allowed to circulate by means as presently described.

In some cases the medium which is expanded and compressed is a coolant gas such as, for example, nitrous oxide which polymerizes under pressure and thus absorbs heat while polymerizing. Such gas absorbs heat while being compressed and releases heat while being expanded. The rate of heat absorption increases with falling temperature. Such gas, for example, nitrous oxide, may be used in the arrangement as described in FIGURES 9–12 and also in FIGURE 13 with, however, the following modifications. The check valves are arranged to operate in opposite fashion in that in this case, the check valves allow relatively free flow of nitrous oxide from the piston chamber to the annular cooling chamber but retards or substantially prevents flow in the reverse direction. Compression of the nitrous oxide decreases the temperature, i.e., produces a cooling action in the cell.

The use of nitrous oxide as described above has an additional advantage when used in conjunction with a cell which exhibits some magnetism. Nitrous oxide has the property of becoming more paramagnetic with increased pressure and since it is known that paramagnetic substances in a magnetic field absorb heat, the magnetism of the cell produces an additional function, i.e., it aids in cooling itself.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A process for reproducing graphic images which comprises exposing to a pattern of electromagnetic radiation a mosaic member comprising a photoelectromagnetic configuration of individual semiconductive crystals and magnetized particles in a mosaic pattern on a transparent backing member in parallel relationship to the printing surface of a member having dispersed thereon particles whereby said particles are caused to be attracted toward said member in accordance with said pattern of electromagnetic radiation so that such particles by moving away from said printing surface leave a corresponding pattern on said printing surface denuded of said particles.

2. The process of claim 1 wherein the temperature of said mosaic member is kept constant by the use of a fluid coolant.

3. The process of claim 1 wherein said particles are adhered to said printing surface by a magnetic force.

4. The process of claim 1 wherein said particles are adhered to said printing surface by an electric force.

5. The process of claim 1 wherein said particles are adhered to said printing surface by a gravitational force.

6. The process of claim 1 wherein said printing surface member is of paper.

7. A member for the photoelectromagnetic reproduction comprising a transparent member having attached thereon a configuration of individual semiconductive crystals and magnetized particles in a mosaic pattern.

8. The member of claim 7 wherein the semiconductor is germanium.

9. The member of claim 7 wherein the semiconductor is indium antimonide.

10. The member of claim 7 wherein the semiconductor is lead sulphide.

11. The member of claim 7 wherein the semiconductor is gallium arsenate.

12. The member of claim 7 wherein the semiconductive crystals are in the form of cubes having a linear dimension of $10^{-4}$ cm. and the magnetized particles are linear magnets having a length of approximately one micron.

References Cited in the file of this patent

UNITED STATES PATENTS

| | | |
|---|---|---|
| 2,599,542 | Carlson | June 10, 1952 |
| 2,628,852 | Voytech | Feb. 17, 1953 |
| 2,739,079 | Keck | Mar. 20, 1956 |
| 2,739,243 | Sheldon | Mar. 20, 1956 |
| 2,758,939 | Sugarman | Aug. 14, 1956 |
| 2,797,172 | Mears | July 25, 1957 |
| 2,824,986 | Rome | Feb. 25, 1958 |
| 2,857,290 | Bolton | Oct. 21, 1958 |
| 2,865,611 | Bentele | Dec. 23, 1958 |
| 2,874,063 | Greig | Feb. 17, 1959 |
| 2,892,709 | Mayer | June 30, 1959 |
| 2,895,847 | Mayo | July 21, 1959 |
| 2,901,374 | Gundlach | Aug. 25, 1959 |
| 3,043,685 | Rosenthal | July 10, 1962 |